Figure 3:
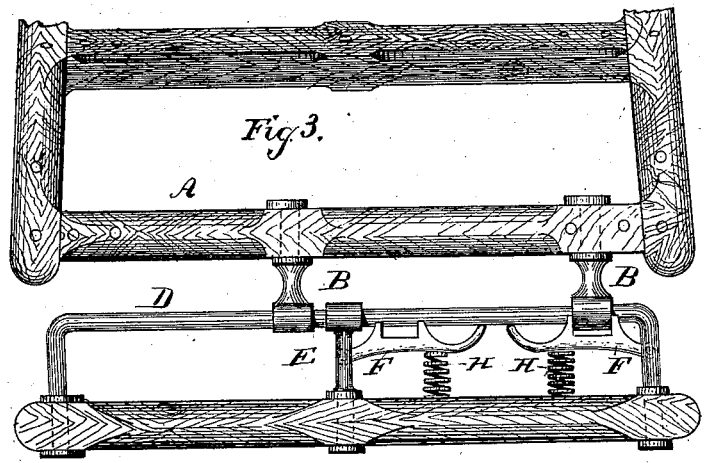

(No Model.) 2 Sheets—Sheet 1.
H. DUFFEY & R. D. WOODFORD.
SHIFTING SLEIGH THILL.
No. 367,377. Patented Aug. 2, 1887.
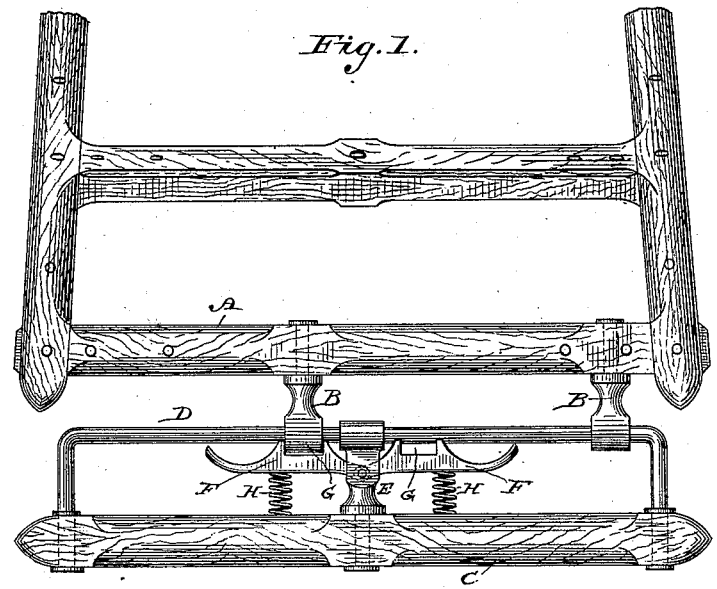
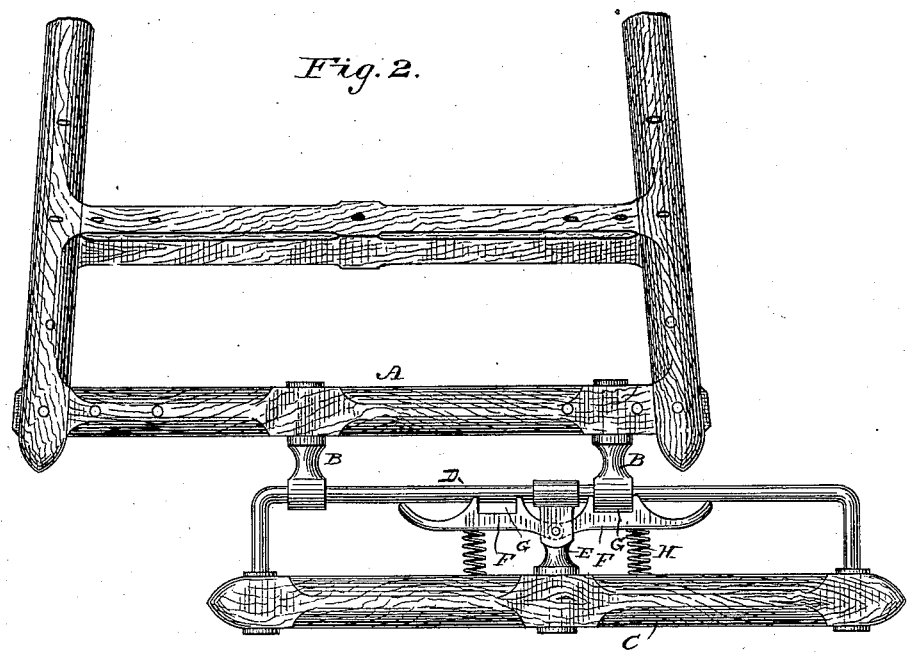
Witnesses
H. W. Elmore
Fred V. Fischer
Inventors
Hugh Duffey
R. D Woodford
By their Attorney
J. R. Nottingham (No Model.) 2 Sheets—Sheet 2.

H. DUFFEY & R. D. WOODFORD.
SHIFTING SLEIGH THILL.

No. 367,377. Patented Aug. 2, 1887.

Attest
C. W. H. Brown.
Frank Baumer,

Inventors:
Hugh Duffey
R. D. Woodford.

J. R. Nottingham
&c., Attys

UNITED STATES PATENT OFFICE.

HUGH DUFFEY AND ROMANTA D. WOODFORD, OF CORTLAND, NEW YORK.

SHIFTING SLEIGH-THILL.

SPECIFICATION forming part of Letters Patent No. 367,377, dated August 2, 1887.

Application filed September 14, 1886. Serial No. 213,531. (No model.)

*To all whom it may concern:*

Be it known that we, HUGH DUFFEY and ROMANTA D. WOODFORD, citizens of the United States, residing at the village of Cortland, in the county of Cortland and State of New York, have invented certain new and useful Improvements in Devices for Shifting the Thills or Shafts of Cutters or Sleighs; and we do hereby declare the following to be a full, clear, and exact description of the invention, such as will enable others skilled in the art to which it appertains to make and use the same.

The object of our invention is to shift or change the shafts or thills of a sleigh or cutter from a center draft to a side draft, and vice versa, without having to remove the thills. This object we accomplish by the mechanism shown in the drawings, and hereinafter described.

In the accompanying drawings, Figure 1 is a plan view of the improvement, showing the device in position for the central or direct draft. Fig. 2 is a plan showing the thills shifted, so that the horse can travel in one of the beaten tracks, the thills being held in position by the mechanism shown. Fig. 3 is a plan showing a modification of the location of the holder of the draw-iron of the thills from the positions shown in Figs. 1 and 2.

In the different figures, in so far as the same parts are intended to be referred to, the same letters indicate like parts.

In the views, A represents the rear cross-piece of the thills, a portion of the thills and the other cross-piece being shown in each figure, but not lettered.

B represents the draw-irons attached or connected to the thills or shafts.

C represents the bar of wood or metal to which the runners of the sleigh or cutter are connected.

D represents the bar or shaft to which the said draw-irons B are connected. The bar D is bent at the corners and is in one piece, being securely held by the bar or beam C. The center pillar or hanger, E, serves the purposes of strengthening the bar D, and also as a gage, the draw-iron B coming almost to it, as shown.

F represents the holder, which has the notch or opening in it, as G, which allows the butt or rear end of the draw-iron to fit into it and prevents the said draw-iron from sliding laterally. This holder F is jointed to the center pillar, E, as shown, a slot being made in said pillar E for that purpose; but in Fig. 3 the right-hand holder is pivoted or jointed to the rod or bar D.

H represents a coiled spring by which each of the holders F is kept in position when desired, thus preventing the said draw-irons B from sliding or moving laterally on the bar D.

It will be observed that by our construction the thills, after being shifted to the central draft, can, when not in use, be readily raised up and turned back against the front of the cutter, thus getting them out of the way and saving room in the barn.

The operation of the devices is as follows: In Figs. 1, 2, and 3 the holders F are drawn back, the coiled springs H allowing for this, and then the draw-irons B are released, and are then slid along on the bar D, and then the desired center or side draft location of the thills, as desired, is obtained, when the holders F spring into place and the draw-irons are thus held in place. It is also plain that many different kinds of springs can be used to take the place and perform the office of the coiled springs H, and we do not intend to confine or limit ourselves to any form of spring for this purpose.

We claim as our invention—

1. The combination, in a sleigh, of the shaft-bar, the draw-irons secured thereto, the bar D, secured to the cross-bar C, the central hanger secured to bar C and provided with an eye to receive the bar D, and the spring-holders pivoted to said hanger, substantially as and for the purposes set forth.

2. The combination, in a sleigh, of the shaft-bar, the draw-irons B, provided with eyes, the bar D, secured to cross-bar C, the central hanger, E, and the spring-holders F, each provided with notches G and pivoted to the central hanger, substantially as shown and described.

In testimony whereof we affix our signatures in presence of two witnesses.

HUGH DUFFEY.
ROMANTA D. WOODFORD.

Witnesses:
JOHN W. SUGGETT,
WAYLAND D. TISDALE.